United States Patent
Hung et al.

(10) Patent No.: US 8,072,784 B2
(45) Date of Patent: Dec. 6, 2011

(54) ELECTRONIC DEVICE AND POWER SUPPLY UNIT THEREOF

(75) Inventors: Chun-Lung Hung, Taipei Hsien (TW); Tao Wang, Shenzhen (CN); Wen-Ming Chen, Shenzhen (CN); Wang-Chang Duan, Shenzhen (CN); Qiang Huang, Shenzhen (CN); Shi-Ming Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 815 days.

(21) Appl. No.: 12/124,171

(22) Filed: May 21, 2008

(65) Prior Publication Data

US 2009/0161394 A1 Jun. 25, 2009

(30) Foreign Application Priority Data

Dec. 21, 2007 (CN) .......................... 2007 1 0203346

(51) Int. Cl.
*H02J 1/10* (2006.01)
(52) U.S. Cl. ............ 363/65; 363/49; 323/228; 323/238; 323/266; 323/271
(58) Field of Classification Search .................. 323/238, 323/901, 223, 224, 225, 265, 266, 271, 272; 363/18, 19, 20, 21.01, 21.04, 21.12, 49, 65
See application file for complete search history.

(56) References Cited

U.S. PATENT DOCUMENTS

| 6,121,761 | A  | * | 9/2000 | Herbert ........................ 323/282 |
| 6,452,364 | B1 |   | 9/2002 | Saeki et al. |
| 7,221,128 | B2 | * | 5/2007 | Usui et al. ..................... 323/207 |
| 7,830,675 | B2 | * | 11/2010 | Nagai et al. ................ 363/21.01 |
| 2008/0175027 | A1 | * | 7/2008 | Shimada et al. ................. 363/49 |

FOREIGN PATENT DOCUMENTS

CN 1209680 A 3/1999

* cited by examiner

*Primary Examiner* — Adolf Berhane
*Assistant Examiner* — Nguyen Tran
(74) *Attorney, Agent, or Firm* — Altis Law Group, Inc.

(57) ABSTRACT

An exemplary electronic device includes a controller, a first convertor, a second convertor, and a switching unit. The first convertor is configured for receiving a first voltage from an external power supply and converting the first voltage into a second voltage. The controller is coupled to the first convertor for generating a start signal when receiving the second voltage. The second convertor is connected to the controller for receiving the first voltage, converting the first voltage into a third voltage to power an operating unit of the electronic device, and converting the first voltage into a fourth voltage to power the controller when receiving the start signal. The switching unit is coupled to the controller and the first convertor for disabling the first convertor when the controller receives the fourth voltage. A related power supply unit is also provided.

17 Claims, 3 Drawing Sheets

ELECTRONIC DEVICE AND POWER SUPPLY UNIT THEREOF

BACKGROUND

1. Field of the Invention

The present invention relates to power supplies, and particularly to an electronic device and its power supply unit.

2. Description of Related Art

Electronic devices such as notebook computers, cellular phones, digital video disk player/recorders, etc are now very popular. Referring to FIG. 3, a typical electronic device 10 includes a power supply unit 100 and an operating unit 150. The power supply unit 100 is configured for receiving power from an external power supply (not shown), and powering the operating unit 150 (load). The external power supply may be an external alternating current (AC) adapter, or a battery unit. The operating unit 150 is a main function unit of the electronic device 10. The operating unit 150 may include a central processing unit, a storage unit, a display unit, etc.

The power supply unit 100 includes a power supply interface 102, a first convertor 104, a controller 106, and a second convertor 108. The power supply interface 102 receives a first direct current (DC) voltage from the external power supply, and conducts/transmits the first DC voltage to the first convertor 104 and the second convertor 108. The first convertor 104 converts the first DC voltage into a second DC voltage to power the controller 106. The controller 106 is connected to the operating unit 150 and to the first and second convertor 104, 108. The controller 106 is used for communicating with the operating unit 150 (detecting operating parameters of the operating unit 150, for example), and managing the power supply of the electronic device 10. In detail, the controller 106 enables the second convertor 108 when receiving the second DC voltage. The second convertor 108 receives the first DC voltage and powers the operating unit 150 when enabled. However, a disadvantage of the power supply unit 100 is that the first convertor 104 still works to supply the second DC voltage to the controller 106 when the second convertor 108 powers the operating unit 150. This inefficiently consumes power of the electronic device 10.

Therefore, an improved electronic device and its power supply unit are needed to address the aforementioned deficiency and inadequacies.

SUMMARY

An exemplary electronic device includes a controller, a first convertor, a second convertor, and a switching unit. The first convertor is configured for receiving a first voltage from an external power supply and converting the first voltage into a second voltage. The controller is coupled to the first convertor for generating a start signal when receiving the second voltage. The second convertor is connected to the controller for receiving the first voltage, converting the first voltage into a third voltage to power an operating unit of the electronic device, and converting the first voltage into a fourth voltage to power the controller when receiving the start signal. The switching unit is coupled to the controller and the first convertor for disabling the first convertor when the controller receives the fourth voltage. A related power supply unit is also provided.

Other advantages and novel features of the present invention will become more apparent from the following detailed description of preferred embodiment when taken in conjunction with the accompanying drawings.

DETAILED DESCRIPTION OF THE EMBODIMENTS

Figure 3:
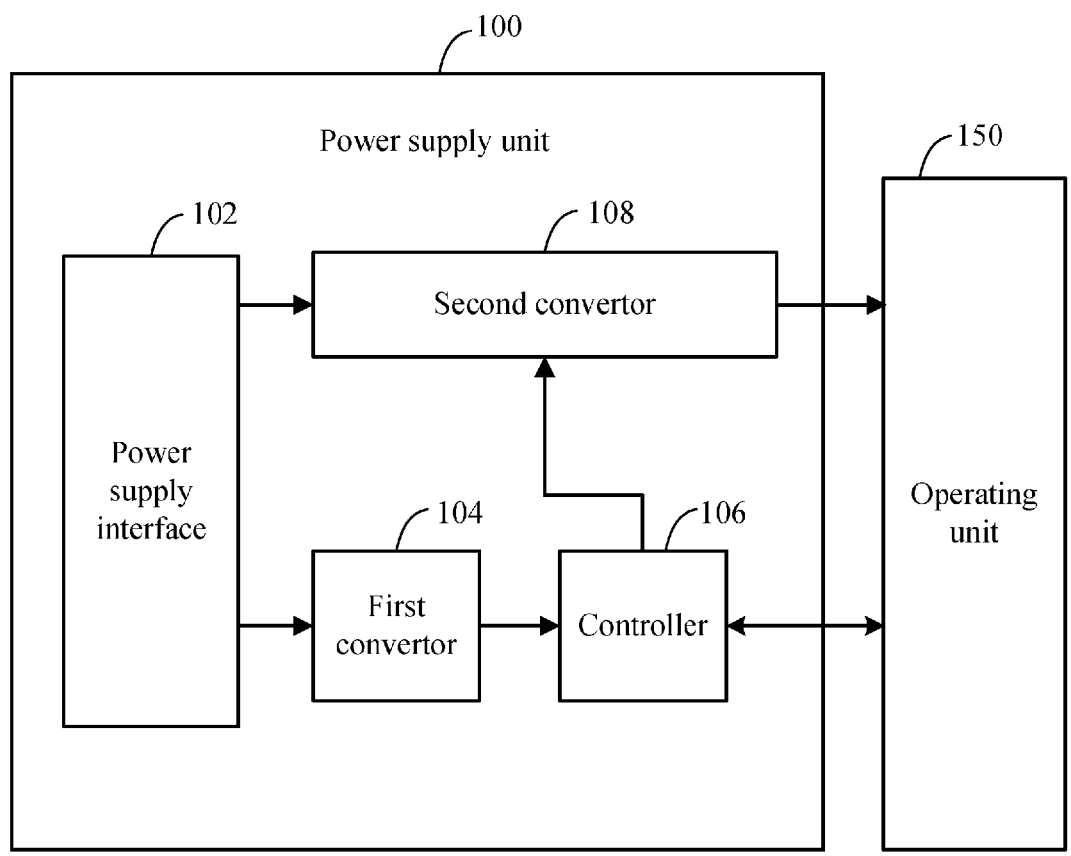
FIG. 3 is a schematic block diagram of a traditional electronic device.

Reference will now be made to the drawings to describe an exemplary embodiment of the present electronic device and its power supply unit. When the power supply unit operates, only one convertor in the power supply unit operates. Therefore, power consumption of the electronic device is efficiently reduced with respect to the electronic device 10 of FIG. 3.

Figure 1:
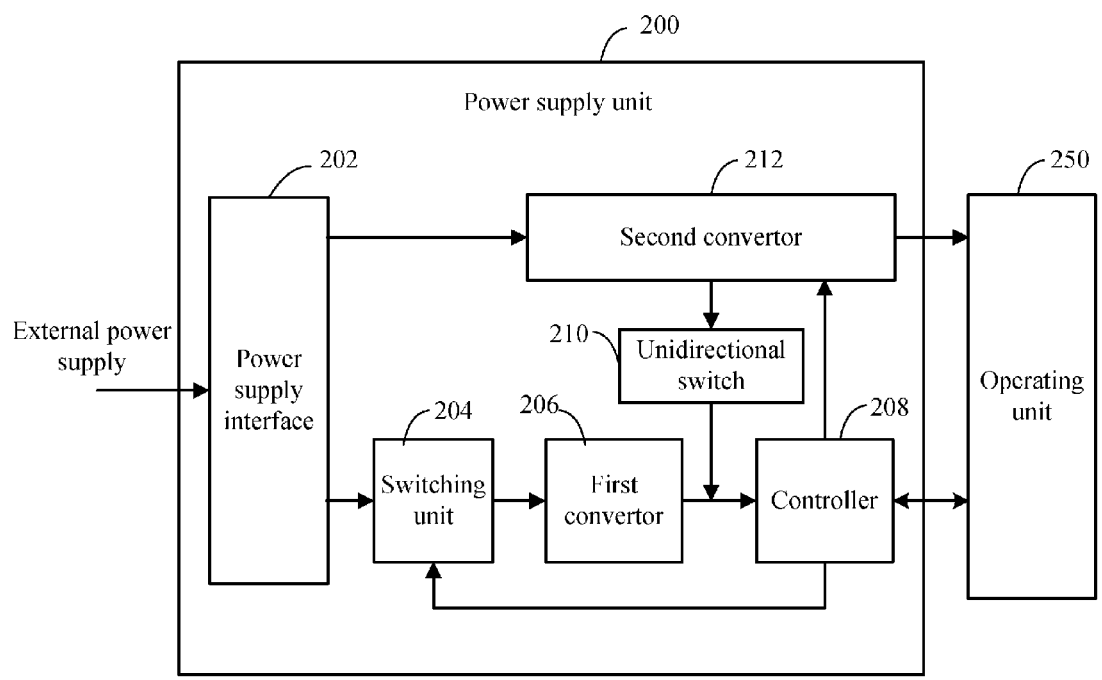
FIG. 1 is a schematic block diagram of an electronic device in accordance with an exemplary embodiment.

Referring to FIG. 1, in an exemplary embodiment, an electronic device 20 includes a power supply unit 200 and an operating unit 250. The power supply unit 200 is configured for receiving power from an external power supply, and powering the operating unit 250 (load) based on the power received. The external power supply may be an external alternating current (AC) adapter for converting an AC voltage into a direct current (DC) voltage, or a battery unit. In the exemplary embodiment, the external power supply outputs a first direct current (DC) voltage (a first voltage for short). The operating unit 250 is a main function unit for executing intended functions (e.g., playing audio/video files, compressing data, etc) of the electronic device 20. The operating unit 250 may include a central processing unit, a storage unit, a display unit, an input unit, etc.

The power supply unit 200 includes a power supply interface 202, a switching unit 204, a first convertor 206, a controller 208, a unidirectional switch 210, and a second convertor 212.

The power supply interface 202 is configured for receiving and conducting/transmitting the first voltage from the external power supply to the switching unit 204 and the second convertor 212.

The first convertor 206 is connected to the switching unit 204 for receiving the first voltage and converting the first voltage into a second voltage to enable and power the controller 208 when the electronic device 20 is powered on. In the exemplary embodiment, the first convertor 206 is a DC/DC convertor composed of a plurality of discrete components.

The second convertor 212 is connected to the power supply interface 202 for receiving the first voltage and converting the first voltage into a third voltage to power the operating unit 250. The second converter 212 further connects to the controller 208 via the unidirectional switch 210 for converting the first voltage into a fourth voltage. The fourth voltage is supplied to the controller via the unidirectional switch 210 to power the controller 208. Understandly, the value of the fourth voltage equals to that of the second voltage. In the exemplary embodiment, the second convertor 212 is an integrated semiconductor DC/DC convertor with low power consumption and high stable output.

The controller 208 is configured for managing the power supply of the electronic device 20, and communicating with the operating unit 250 (detecting operating parameters of the operating unit 250, for example). In the exemplary embodiment, the controller 208 generates a start signal (a high voltage, 5 volts for example) to enable the second convertor 212 when the controller 208 receives the second voltage from the first convertor 206. The controller 208 is further coupled to the switching unit 204 for generating a stop signal (maybe also a high voltage, 5 volts for example) when receiving the fourth voltage from the second convertor 212. The stop signal is transmitted to the switching unit 204.

Figure 2:
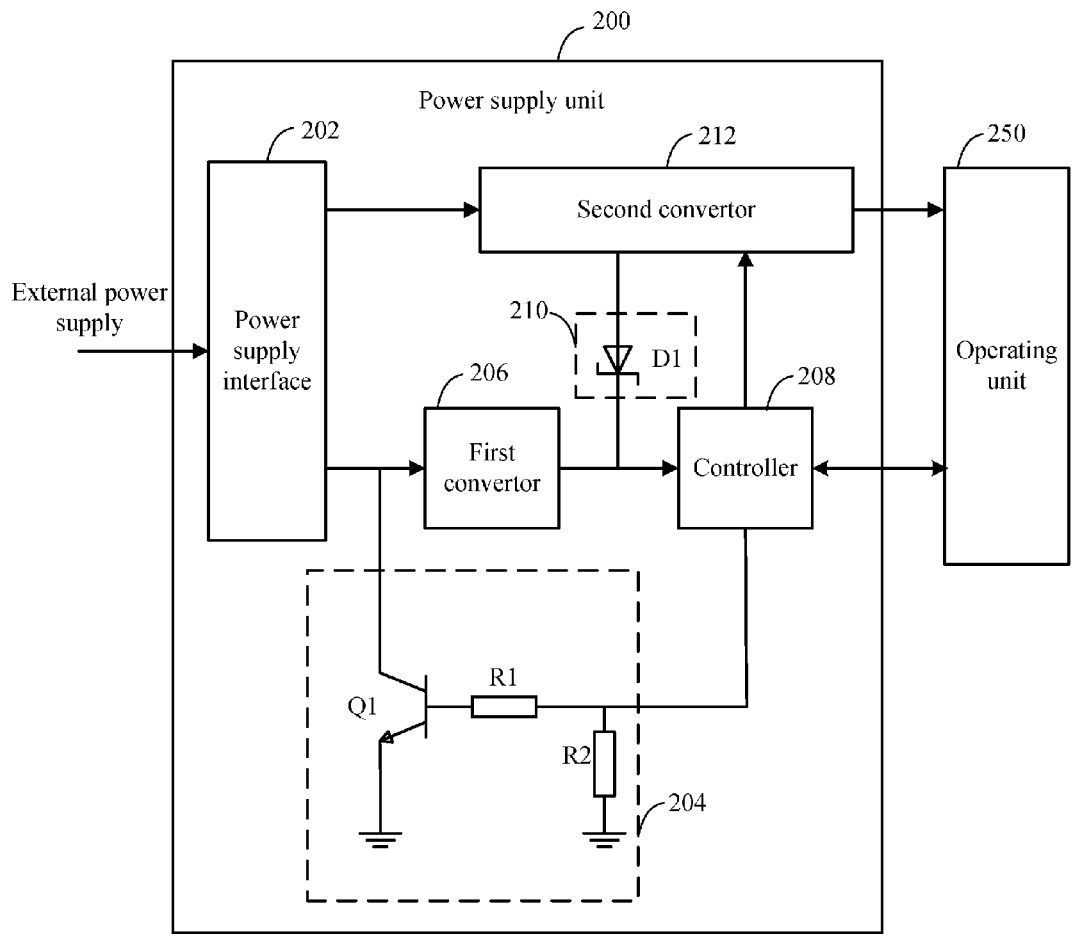
FIG. 2 is a schematic diagram showing a structure of the electronic device of FIG. 1.

The unidirectional switch 210 is used for conducting the fourth voltage from the second convertor 212 to the controller 208. Referring also to FIG. 2, in the exemplary embodiment, the unidirectional switch 210 is a Schottky Barrier diode D1. The anode of the diode D1 is connected to the second convertor 212, and the cathode of the diode D1 is connected to a power input terminal of the controller 208.

The switching unit 204 is configured for disabling the first convertor 206 when receiving the stop signal. One method for disabling the first convertor 206 is to cut off a connection between the power supply interface 202 and the first convertor 206, that is, powering off the first convertor 206. For example, the switching unit 204 includes a relay. A normally closed relay switch of the relay is connected in series between the power supply interface 202 and the first convertor 206, and the relay winding is connected in series with the unidirectional switch 210. When the controller 208 is enabled or the second convertor 212 starts to power the controller 208, the relay winding is electrified, thus the normally closed relay switch becomes opened, and the first convertor 206 becomes disabled.

Another method for disabling the first convertor 206 is to reduce the first voltage to a predetermined value (lower than 0.7 volts, for example) that cannot enable the first convertor 206. For example, referring to FIG. 2, the switching unit 204 includes an NPN type bipolar junction transistor (BJT) Q1, a first resistor R1, and a second resistor R2. The collector of the BJT Q1 is electrically connected to a power input terminal of the first convertor 206, the base of the BJT Q1 is electrically connected to the controller 208 via the first resistor R1, and the emitter of the BJT Q1 is grounded. One terminal of the second resistor R2 is connected to a node between the first resistor R1 and the controller 208, and another terminal of the second resistor R2 is grounded. When the controller 208 outputs a high voltage (5V, for example), the BJT Q1 turns on, and the power input terminal of the first convertor 206 becomes grounded. Thus, the first convertor 206 becomes disabled.

To sum up, only one convertor operates when the power supply unit 200 operates. Before the power supply unit 200 starts powering the operating unit 250, the first convertor 206 operates, while the second convertor 212 is disabled. When the power supply unit 200 powers the operating unit 250, the second convertor 212 operates, while the first convertor 206 is disabled. As a result, the electronic device 20 consumes power more efficiently.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising:
    a first convertor for receiving a first voltage from an external power supply and converting the first voltage into a second voltage;
    a controller coupled to the first convertor for generating a start signal when receiving the second voltage;
    a second convertor connected to the controller for receiving the first voltage, converting the first voltage into a third voltage to power an operating unit of the electronic device, and converting the first voltage into a fourth voltage to power the controller when receiving the start signal; and
    a switching unit coupled to the controller and the first convertor for disabling the first convertor when the controller receives the fourth voltage.

2. The electronic device as described in claim 1, further comprising a power supply interface for receiving the first voltage from the external power supply, and transmitting the first voltage to the first convertor and the second convertor.

3. The electronic device as described in claim 1, wherein the controller is further configured for generating a stop signal when receiving the fourth voltage from the second convertor, and the switching unit disables the first convertor in response to the stop signal.

4. The electronic device as described in claim 3, further comprising a unidirectional switch for conducting the fourth voltage from the second convertor to the controller.

5. The electronic device as described in claim 4, wherein the unidirectional switch is a diode, an anode of the diode is connected to the second convertor, and a cathode of the diode is connected to a power input terminal of the controller.

6. The electronic device as described in claim 1, wherein the switching unit comprises a bipolar junction transistor, a collector of the bipolar junction transistor is electrically connected to a power input terminal of the first convertor, a base of the bipolar junction transistor is electrically connected to the controller, and an emitter of the bipolar junction transistor is grounded.

7. The electronic device as described in claim 1, wherein the switching unit cuts off a connection between a power supply surface and the first convertor to disable the first convertor.

8. The electronic device as described in claim 1, wherein the switching unit reduces the first voltage to a predetermined value which cannot enable the first convertor.

9. A power supply unit for an electronic device comprising an operating unit, the power supply unit comprising:
    a first convertor for receiving a first voltage from an external power supply and converting the first voltage into a second voltage;
    a controller coupled to the first convertor for generating a start signal when receiving the second voltage;
    a second convertor connected to the controller for receiving the first voltage, converting the first voltage into a third voltage to power an operating unit of the electronic device, and converting the first voltage into a fourth voltage to power the controller when receiving the start signal; and
    a switching unit coupled to the controller and the first convertor for disabling the first convertor when the controller receives the fourth voltage.

10. The power supply unit as described in claim 9, further comprising a power supply interface for receiving the first voltage from the external power supply, and transmitting the first voltage to the first convertor and the second convertor.

11. The power supply unit as described in claim 9, wherein the controller is further configured for generating a stop signal when receiving the fourth voltage from the second convertor, and the switching unit disables the first convertor in response to the stop signal.

12. The power supply unit as described in claim 11, further comprising a unidirectional switch for conducting the fourth voltage from the second convertor to the controller.

13. The power supply unit as described in claim 12, wherein the unidirectional switch is a diode, an anode of the diode is connected to the second convertor, and a cathode of the diode is connected to a power input terminal of the controller.

14. The power supply unit as described in claim 9, wherein the switching unit comprises a bipolar junction transistor, a collector of the bipolar junction transistor is electrically connected to a power input terminal of the first convertor, a base of the bipolar junction transistor is electrically connected to the controller, and an emitter of the bipolar junction transistor is grounded.

15. The power supply unit as described in claim 9, wherein the switching unit cuts off a connection between a power supply surface and the first convertor to disable the first convertor.

16. The power supply unit as described in claim 9, wherein the switching unit reduces the first voltage to a predetermined value which cannot enable the first convertor.

17. The power supply unit as described in claim 9, wherein a value of the second voltage is equal to a value of the fourth voltage.

* * * * *